United States Patent
Sakashita

(10) Patent No.: US 6,753,076 B2
(45) Date of Patent: Jun. 22, 2004

(54) FORGERY-PREVENTIVE IDENTIFICATION MEDIUM AND METHOD FOR ASCERTAINING THE GENUINENESS THEREOF

(75) Inventor: Hitoshi Sakashita, Saitama (JP)

(73) Assignee: Lintec Corporation, Tokyo (JP)

( * ) Notice: Subject to any disclaimer, the term of this patent is extended or adjusted under 35 U.S.C. 154(b) by 44 days.

(21) Appl. No.: 09/904,347

(22) Filed: Jul. 12, 2001

(65) Prior Publication Data

US 2002/0006517 A1 Jan. 17, 2002

(30) Foreign Application Priority Data

Jul. 14, 2000 (JP) ........................................ 2000-214401

(51) Int. Cl.[7] ............................................. B42D 15/00
(52) U.S. Cl. ....................... 428/323; 428/692; 235/493; 283/82; 360/2
(58) Field of Search ................................ 428/323, 692; 235/493; 283/82; 360/2

(56) References Cited

U.S. PATENT DOCUMENTS

| 4,183,989 A | * | 1/1980 | Tooth .................... 428/195.1 |
| 5,614,824 A | * | 3/1997 | Dames et al. ............... 324/239 |
| 5,631,039 A | * | 5/1997 | Knight et al. ................. 427/7 |
| 5,648,160 A | * | 7/1997 | Kishimoto et al. ......... 428/328 |
| 6,146,773 A | * | 11/2000 | Kaule ........................ 428/611 |
| 6,155,605 A | * | 12/2000 | Bratchley et al. ............. 283/72 |

FOREIGN PATENT DOCUMENTS

| EP | 0 291 306 | 11/1988 |
| JP | 8-138921 | 5/1996 |
| JP | 9-102117 | 4/1997 |
| JP | 9-134519 | 5/1997 |
| JP | 08175926 | 11/1997 |
| JP | 2922474 | 6/1998 |
| JP | 10-172134 | 8/1998 |
| JP | 10-269556 | 10/1998 |
| JP | 10036458 | 8/1999 |
| JP | 10218113 | 2/2000 |

\* cited by examiner

*Primary Examiner*—Stevan A. Resan
(74) *Attorney, Agent, or Firm*—Norris McLaughlin & Marcus PA

(57) ABSTRACT

The present invention discloses:
  a forgery-preventive identification medium before recording comprising:
  a substrate containing identification elements, and
  a magnetic layer for magnetic signal recording, formed at the predetermined portion of the substrate,
wherein the magnetic layer contains at least a MnBi magnetic powder; and a method for ascertaining the genuineness thereof.

5 Claims, No Drawings

FORGERY-PREVENTIVE IDENTIFICATION MEDIUM AND METHOD FOR ASCERTAINING THE GENUINENESS THEREOF

BACKGROUND OF THE INVENTION

1. Field of the Invention

The present invention relates to a forgery-preventive identification medium as well as to a method for ascertaining the genuineness of such an identification medium.

More particularly, the present invention relates to a forgery-preventive identification medium wherein the identification information constituted by the identification elements on the medium is recorded in the magnetic layer of the medium as inerasable recorded information, as well as to a method for ascertaining the genuineness of such an identification medium by reading and comparing the identification information and the inerasable recorded information in the magnetic layer. This identification medium is usable in various applications such as gold note, credit card and the like.

2. Description of the Related Art

Currently, a large amount of important documents are in circulation in society. Such documents include, for example, securities such as bond, merchandise ticket, check, credit card, entrance ticket, passenger ticket, boarding ticket and the like; banknotes; and certificates such as passport, driving license, ticket for registered member and the like.

To prevent the illegal use of such important documents and secure safe transactions in society, it is extremely important to reliably prevent the forgery or alteration of these important documents. Therefore, it is highly needed to prevent the forgery or alteration of the above important documents and secure the safety for such act and the high reliability for the documents.

With an increase in the circulation amount of the important documents, however, the forgery or alteration thereof has increased as well and the damage thereby has reached an immense level.

For prevention of the forgery or alteration of the above important documents, there have been employed various methods using, in combination, (1) visible information (e.g. fine printing formed by a high printing technique), watermark or hologram and (2) a magnetic reading system. These methods can be carried out at a relatively low cost.

Meanwhile, the forgery or alteration of the above important documents has become easier in recent years than before owing to, for example, (a) the development of high printing techniques, (b) the development and spread of personal computers and associated apparatuses and (c) the spread of high-quality copiers. As a result, by utilizing the above apparatuses, the forgery or alteration of important documents, etc. is taking place one after another.

Currently, an identification information technique enabling automatic identification by utilizing optical reading, magnetic reading, etc. is in use in various fields. For example, a bar code system using this technique improved the interface between user and system in information processing. As a result, this technique became usable in many application fields. Simultaneously therewith, illegal acts skillfully utilizing the technique increased. Hence, the situation surrounding the technique is changing greatly.

That is, high safety is needed in the fields using the identification information technique enabling automatic identification. However, illegal acts are increasing in these fields as well.

For example, in the fields using an IC (integrated circuit) card, etc., there are being used IC cards having a security function by employing an information processing technique based on a soft ware or a firm ware. Even in such cards, however, illegal acts are appearing. In fact, IC cards, etc. having a read/write function are considered to basically have a room allowing illegal acts; therefore, it is impossible to completely eliminate the illegal acts.

Nevertheless, techniques for minimizing such illegal acts are under study, as well known.

As one of such techniques for minimization of illegal acts, it was proposed to allow the substrate (e.g. paper or plastic card) constituting an important document to possess unalterable identification information. In using this document, the unalterable identification information is referred with the instrument-readable information (e.g. visible information) possessed by the substrate, whereby any illegal act for the document is prevented.

In this technique, it is essential that the identification information possessed by the important document is unalterable by any illegal act. Further, it is desired that the technique can be carried out at a low cost and allows use of an existing system.

Currently, there is no technique for prevention of illegal act which satisfies all of these requirements.

SUMMARY OF THE INVENTION

In view of the above situation, the present invention aims at providing a forgery-preventive identification medium free from the above problems and a method for ascertaining the genuineness of such an identification medium.

The present invention lies in the followings.

[1] A Forgery-preventive Identification Medium Comprising
   a substrate containing identification elements, and
   a magnetic layer for magnetic signal recording, formed at the predetermined portion of the substrate,
Wherein the magnetic layer contains at least a MnBi magnetic powder.

[2] A Method for Ascertaining the Genuineness of a Forgery-preventive Identification Medium of Claim 1 Comprising the Steps of:
   reading its identification information constituted by the identification elements,
   recording the information in the MnBi containing magnetic layer as inerasable recorded information,
   reading the identification information and the inerasable recorded information both of the forgery-preventive identification medium, and
   comparing the two informations.

The forgery-preventive identification medium of the present invention comprises a substrate containing identification elements and a magnetic layer for recording magnetic signal, formed on the substrate. The magnetic layer contains MnBi and allows substantially no rewrite of information under ordinary conditions. The information of the identification elements is recorded in this magnetic layer and, when the resulting identification medium is used, the information of the identification elements and the information recorded in the magnetic layer are read and compared. Thus, the information recorded in the magnetic layer is substantially unalterable under ordinary conditions. As a result, the forgery-preventive identification medium of the present invention can reliably prevent its forgery or alteration. Further, the present identification medium can use identification elements of various kinds and, therefore, has wide applications and can be ascertained reliably. In an identification medium produced using a magnetic layer used in ordinary magnetic tapes, etc., the magnetic information recorded in the magnetic layer can be easily erased by applying a strong magnetic field to the identification medium. Therefore, such an identification medium can be easily identified as a forgery.

DETAILED DESCRIPTION OF THE PREFERRED EMBODIMENT

The forgery-preventive identification medium of the present invention comprises a substrate containing identification elements and a magnetic layer for magnetic signal recording, formed at the predetermined portion of the substrate.

The magnetic layer contains a MnBi magnetic powder. The coercive force of the MnBi magnetic powder is as high as about 12,000 Oe at 300 K (27° C.) but is 1,500 Oe or less at 100 K (−173° C.). The magnetic layer is demagnetizable at 100 K. In the magnetic layer after demagnetization, magnetic signal can be recorded at ordinary temperatures using an ordinary recorder. However, the once-recorded signal allows no erasing or alteration at ordinary temperatures at a magnetism possessed by an ordinary recorder.

In the present invention, the identification information constituted by the identification elements contained in the substrate is read and recorded in the MnBi magnetic powder-containing magnetic layer as inerasable recorded information, to obtain a forgery-preventive identification medium of the present invention. In using this identification medium, the identification information constituted by the identification elements contained in the substrate is read and compared with the inerasable recorded information in the magnetic layer. When the two information agree, the identification medium is regarded as genuine. [Forgery-preventive identification medium before recording]

As mentioned above, the forgery-preventive identification medium of the present invention comprises a substrate containing identification elements and a MnBi magnetic powder-containing magnetic layer for magnetic signal recording, formed at the predetermined portion of the substrate.

The substrate has no particular restriction as to the shape, material, etc. However, when a conventional reader and a conventional recorder both utilizing magnetism are used, the shape is preferably such that allows the use of these devices. In view of the spread of plastic-made cards (e.g. credit card), the shape of the substrate is preferably rectangular, square, elliptical, circular, etc.

There is no particular restriction as to the material of the substrate. However, a Plastic, a paper or the like is preferred.

The substrate has identification information (e.g. pattern) constituted by a large number of the identification elements (the information is different depending upon the substrate).

The identification elements may be arranged at random or regularly in the substrate. An aggregate of the identification elements constitute the identification information. There is no particular restriction as to the identification information per se, and it can be any identification information which can be detected by an ordinary information-detecting means utilizing light, magnetism, electricity or the like and can be converted into an electric signal. As specific examples of the substrate having identification information, there can be mentioned a paper or plastic sheet in which metal fibers of stainless steel, aluminum, copper, silver or the like, or metal-deposited, metal-plated or metal-heat-bonded synthetic fibers or glass fibers are mixed or dispersed; or a paper or plastic sheet in which fibers (e.g. dyed natural or synthetic fibers) kneaded or colored with a dye or a pigment are mixed or dispersed randomly.

Also, the identification information may be formed at random or regularly by printing or typing using an ink containing a powder of the above metal or its oxide, a dye, a pigment or the like.

The magnetic layer for magnetic signal recording contains at least a MnBi magnetic powder. In this magnetic layer, identification information is recorded as inerasable recorded information before the practical use of the forgery-preventive identification medium.

The MnBi magnetic powder and the technique for magnetic recording therewith are known. MnBi magnetic powders and techniques for magnetic recording therewith are described in, for example, JP-Application Laid Open 10-172134, JP-Application Laid Open 10-269556, JP-Application Laid Open 9-134519, JP-Application Laid Open 9-102117 and JP-Application Laid Open 8-138921. These literatures are incorporated in the present specification.

The MnBi magnetic powder used in the present invention has particle diameters of preferably 0.1 to 30 $\mu$m.

The formation of the magnetic layer containing a MnBi magnetic powder, on the substrate can be conducted by kneading the MnBi magnetic powder with a resin and coating the kneaded material directly on the predetermined portion of the substrate.

Such formation can also be conducted, for example, by making the kneaded material into a sheet and attaching the sheet to the substrate, or by embedding the sheet in the substrate, or by coating the kneaded material on a sheet, cutting the coated sheet into a given size, and attaching the cut sheet to the predetermined portion of the substrate using an adhesive or the like.

The resin kneaded with the magnetic powder can be a resin used in production of ordinary magnetic recording medium. Specific examples of such a resin can be a vinyl chloride resin, a vinyl chloride-vinyl acetate copolymer, an acrylic resin, a polybutyral resin, a cellulose type resin, a fluororesin, a polyurethane resin and an isocyanate compound. Incidentally, a known solvent can be used in the kneading of the MnBi magnetic powder with the resin.

There is no particular restriction as to the portion of the substrate where a magnetic layer is formed. The portion can be any portion as long as the identification information recorded in the magnetic layer can be read. When the forgery-preventive identification medium of the present invention is produced in a typical plastic card shape, the magnetic layer is preferably formed at a portion of the substrate agreeing with the substrate site undergoing the sweep of the magnetic head of an ordinary magnetic information reader.

The magnetic layer may be formed on the substrate or in the substrate. The formation of the magnetic layer in the substrate can be conducted, for example, by forming a magnetic layer on one side of a substrate and then attaching another substrate to the magnetic layer, or by forming a magnetic layer in the shape of a plastic film of 4 to 50 $\mu$m in thickness, cutting the magnetic layer in a given width to prepare a magnetic tape thread and placing the thread between two substrates.

When the magnetic layer is in the substrate, a third person is difficult to know the position of the magnetic layer, and rewrite in the magnetic layer by the third person for forgery is difficult. Therefore, it is preferred to form the magnetic layer in the substrate.

The magnetic layer may contain, besides the MnBi magnetic powder, other known magnetic powder used in ordinary magnetic recording media. The other magnetic powder can be exemplified by a metallic magnetic powder composed mainly of iron; a hexagonal system ferrite magnetic powder of barium ferrite, strontium ferrite or the like; $Co-\gamma-Fe_2O_3$; and the like.

It is possible to form a magnetic layer containing the above-mentioned other magnetic powder, on a magnetic layer containing the MnBi magnetic powder.

[Method for Ascertainment of the Genuineness of Forgery-preventive Identification Medium]

The forgery-preventive identification medium of the present invention is constituted as mentioned above. By recording inerasable information in the magnetic layer of the identification medium before practical use, a forgery-preventive identification medium for practical use is obtained. Description is made below on the method for ascertaining the genuineness of the forgery-preventive identification medium.

Demagnetization of the Magnetic Layer Containing a MnBi Magnetic Powder

As mentioned previously, the magnetic layer containing a MnBi magnetic powder has lower coercive forces at low temperatures and has 1,500 Oe or less at 100 K. Therefore, the magnetic layer can be demagnetized by conducting an ordinary demagnetization operation at this low temperature.

Recording of Inerasable Magnetic Information

In the present invention, the thus-demagnetized forgery-preventive identification medium before recording is scanned at the predetermined portion to read the identification information (e.g. pattern) constituted by the identification elements, as electronic information. The identification information read as electronic information is recorded in the demagnetized magnetic layer of the forgery-preventive identification medium.

The identification information constituted by the identification elements of the identification medium can be read by scanning the surface of the identification medium using a metal detector, a magnetic head, a Gunn oscillator or the like, when the identification information (e.g. pattern) constituted by the identification elements is formed by mixing or dispersing metal fibers or metal-coated fibers in a substrate, i.e. a paper or a plastic.

When the identification information is formed by mixing or dispersing colored fibers in a substrate (a paper or a plastic), the identification information can be read, for example, by catching the color information on the identification medium using an image sensor or the like and subjecting it to image processing.

The MnBi magnetic powder-containing magnetic layer demagnetized at a low temperature can easily record magnetic information at an ordinary temperature (about 300 K) using an ordinary magnetic information recorder for magnetic recording medium. As mentioned previously, the magnetic recording information recorded therein at an ordinary temperature is extremely difficult to erase or alter at an ordinary temperature using an ordinary magnetic information recorder.

Ascertainment of the Genuineness of Forgery-preventive Identification Medium

Next, description is made on the method for distinguishing the above-produced forgery-preventive identification medium of the present invention from a forged identification medium.

First, from an identification medium to be examined are read, at the above-mentioned portions, the identification information and the recorded information in the magnetic layer, using a reader. Then, the read identification information and the read recorded information are compared.

When the two read information are concluded to be different from each other, the identification medium examined is ascertained as "forged". When the two read information agree with each other, the identification medium examined is ascertained as "genuine". The comparison of the two information can be conducted by known information processing.

Then, description is made on other method for ascertainment of the genuineness of an identification medium.

A forged identification medium contains no MnBi magnetic powder in the magnetic layer and contains, in the magnetic layer, only a magnetic powder allowing write, alteration and erasion by an ordinary magnetic information recorder.

In this method, first, a magnetic field having such an intensity as can sufficiently demagnetize an ordinary magnetic recording medium is applied to an identification medium to be examined, for its demagnetization. When the identification medium is a forged identification medium, the recorded information in the magnetic layer is erased by this demagnetization. Then, the identification information and the recorded information in the magnetic layer are compared in the same manner as mentioned previously. Since the recorded information in the magnetic layer containing no MnBi magnetic powder is already lost by the above demagnetization, the two information do not agree with each other. Therefore, the identification medium examined can be easily ascertained as "forged".

Meanwhile, the forgery-preventive identification medium of the present invention contains MnBi in the magnetic layer. This magnetic layer is not demagnetized by a magnetic field having such an intensity as can demagnetize an ordinary magnetic recording medium. Therefore, when the identification medium examined is a forgery-preventive identification medium of the present invention, the two information agree with each other and the identification medium examined can be ascertained as "genuine".

Application, to an identification medium to be examined, of a magnetic field of such an intensity as can demagnetize an ordinary magnetic recording medium, can be conducted by fitting, to the front of the magnetic head of a magnetic information reader, a magnet capable of forming a magnetic field having an intensity sufficient for required demagnetization. Application of a magnetic field in such a manner enables demagnetization and read of recorded information, in a series of operations and is preferred.

The forgery-preventive identification medium of the present invention produced as above is used in securities such as bond, merchandise ticket, check, credit card, entrance ticket, passenger ticket, boarding ticket and the like; banknotes; certificates such as passport, driving license, ticket for registered member and the like; tags; labels; and so forth.

EXAMPLES

The present invention is described more specifically below by way of Examples.

Example 1

A vinyl chloride resin sheet of 0.5 mm in thickness into which 0.5% by weight of stainless steel fibers of 5 mm in average length and 45 μm in average diameter were kneaded, was cut into a size of 9 cm×5 cm to produce a substrate.

Separately, 50% by weight of a MnBi magnetic powder of 0.9 μm in average particle diameter and 50% by weight of a polyvinyl chloride were added to tetrahydrofuran and mixed therein to prepare a MnBi paste.

This MnBi paste was coated on the substrate at its place 1 cm distant from one lengthwise side of the substrate while an orientation magnetic field of 3,000 Oe was applied in the lengthwise direction of the substrate, to form a magnetic layer of 1 cm (width)×9 cm (length)×20 μm (thickness). Thereby, a forgery-preventive identification medium before recording of the present invention was produced.

This identification medium was subjected to the following ascertainment test.

The above identification medium was demagnetized at 100 K and returned to room temperature. Then, the identification medium was scanned at the center using a detector constituted by a microwave oscillator using a Gunn oscillator and a microwave receiver using a Schottky diode (Japanese Patent No. 2659014), to read the identification information of the identification medium constituted by the identification elements, and the read identification information was recorded in the magnetic layer of the identification medium as recorded information.

Then, the identification information and the recorded information both of the identification medium after recording were read using a reader, and the two information were compared. As a result, the two information agreed with each other and the identification medium after recording was ascertained as "genuine".

Also, it was tried to scan the above identification medium at its site 1 cm distant from another side further from the magnetic layer, using the above detector to read the identification information and write the information in the magnetic layer using an ordinary magnetic recorder, for alteration of the recorded information in the magnetic layer. However, rewrite (alteration) of the recorded information was impossible.

Example 2

A substrate sheet containing identification elements was produced. 100 parts by weight of a wood pulp [conifer breached kraft pulp (NBKP)/hardwood breached kraft pulp (LBKP)=20/80] was mixed with 1 part by weight of identification elements (silver-plated glass fibers, average diameter=5 μm, average length=7 mm), 0.5 part by weight of a rosin sizing agent and 2 parts by weight of aluminum sulfate, to prepare a furnish.

Then, using this furnish and a paper machine, there was produced a paper of 102 g/m² and 125 μm in thickness, containing the above-mentioned identification elements. Oxidized starch was coated on the both sides of the paper in an amount of 1 g/m² (each side), using a size press.

The paper was cut into a size of 9 cm×5 cm. On the surface of the cut paper was formed a magnetic layer in the same manner as in Example 1, to produce a forgery-preventive identification medium before recording of the present invention.

In the same manner as in Example 1, the identification information constituted by the identification elements possessed by this identification medium was recorded in the magnetic layer.

Then, the identification information of the identification elements and the recorded information in the magnetic layer were read by a reader, and the two information were compared. As a result, the two information agreed with each other and the identification medium after recording was ascertained as "genuine".

Also, it was tried to scan the above identification medium at its site 1 cm distant from another side further from the magnetic layer, using the above detector, to read the identification information and to write the information in the magnetic layer using an ordinary magnetic recorder, for alteration of the recorded information in the magnetic layer. However, rewrite (alteration) of the recorded information was impossible.

Comparative Example 1

An identification medium was produced in the same manner as in Example 1 except that an ordinary iron oxide powder was used in the magnetic layer in place of the MnBi magnetic powder used in Example 1. This identification medium was subjected to the same ascertainment test as in Example 1. As a result, the identification medium was ascertained as "genuine". However, the recorded information in the magnetic layer could be rewritten by a magnetic recorder. Therefore, prevention of alteration was impossible with this identification medium.

Example 3

A substrate sheet of 102 g/m² and 125 μm in thickness, containing identification elements was produced using a paper machine, in the same manner as in Example 2.

Separately, the same MnBi paste as used in Example 1 was coated on a polyethylene terephthalate film of 12 μm in thickness to form a magnetic layer having a thickness of 20 μm as dried. This magnetic layer was cut into a width of 0.5 cm to produce a magnetic thread.

Then, the above-produced substrate sheet containing identification elements and a wood-free paper of 52.3 g/m² (about 64 μm in thickness) were each coated with an acrylic type adhesive in a thickness of 13 g/m² as dried. Then, on the adhesive-coated side of the substrate sheet was placed the above-produced magnetic thread, after which the adhesive-coated side of the wood-free paper was laminated onto the adhesive-coated side (having the magnetic thread thereon) of the substrate sheet. This laminated sheet was cut into a size of 9 cm×5 cm to produce a forgery-preventive identification medium before recording of the present invention.

In the same manner as in Example 1, the identification information constituted by the identification elements of the identification medium was read and recorded in the magnetic layer.

Then, the identification information and the recorded information both of the identification medium after recording were read using a reader, and the two information were compared. As a result, the two information agreed with each other and the identification medium after recording was ascertained as "genuine".

Also, it was tried to scan the above identification medium at its site 1 cm distant from the another side further from the magnetic layer, using the above detector, to read the identification information and write the information in the magnetic layer using an ordinary magnetic recorder, for alteration of the recorded information in the magnetic layer. However, rewrite (alteration) of the recorded information was impossible.

Example 4

An acrylic adhesive was coated, in a thickness of 15 μm as dried, on the treated side of a release sheet (thickness=38

µm) (a sheet obtained by treating one side of a polyethylene terephthalate film with a silicone type releasing agent), followed by drying. To the adhesive-applied side of the release sheet was attached a polyethylene terephthalate film of 12 µm in thickness. On the side of the 12 µm-thick polyethylene terephthalate film not contacting with the adhesive was coated the same MnBi paste as used in Example 1, to form a magnetic layer of 20 µm in thickness, whereby a magnetic adhesive sheet was produced.

The magnetic adhesive sheet was cut into a size of 9 cm (length)×1 cm (width). From the cut sheet was peeled off the release sheet. The resulting sheet was attached, via the adhesive, to the identification medium containing identification elements, produced in Example 1, whereby was produced a forgery-preventive identification medium before recording of the present invention.

In the same manner as in Example 1, the identification information constituted by the identification elements of the identification medium was read and recorded in the magnetic layer.

Then, the identification information and the recorded information both of the identification medium after recording were read using a reader, and the two information were compared. As a result, the two information agreed with each other and the identification medium after recording was ascertained as "genuine".

Also, it was tried to scan the above identification medium at its site 1 cm distant from another side further from the magnetic layer, using the above detector, to read the identification information and write the information in the magnetic layer using an ordinary magnetic recorder, for alteration of the recorded information in the magnetic layer. However, rewrite (alteration) of the recorded information was impossible.

What is claimed is:

1. A forgery-preventive identification medium comprising:
   a substrate containing identification elements, the identification elements comprising identification information, and
   a magnetic layer comprising a MnBl magnetic powder, for magnetic signal recording, formed on or within the substrate,
   wherein the identification information is recorded in the magnetic layer, in addition to being present separately in the identification elements on the substrate.

2. A forgery-preventive identification medium according to claim 1, wherein the substrate is a paper or a plastic.

3. A forgery-preventive identification medium according to claim 1, wherein the MnBi powder has particle diameters of 0.1 to 30 µm.

4. A method for ascertaining the genuineness of the forgery-preventive identification medium of claim 1 comprising the steps of:
   reading its identification information constituted by the identification elements,
   recording the information in the MnBi containing magnetic layer as an inerasable recorded information,
   reading the identification information end the inerasable recorded information both of the forgery-preventive identification medium, and comparing the two informations.

5. A method for ascertaining the genuineness of a forgery-preventive identification medium according to claim 4, further comprising the step of conducting a demagnetization operation prior to reading and comparing the two informations.

* * * * *